Patented Aug. 19, 1930

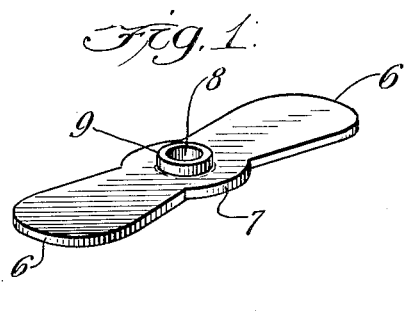
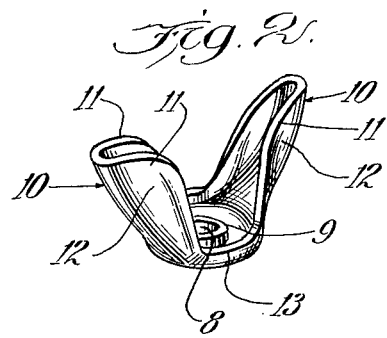
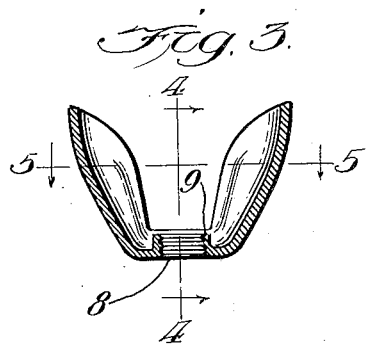
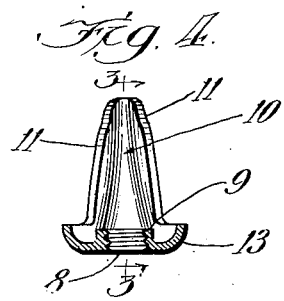
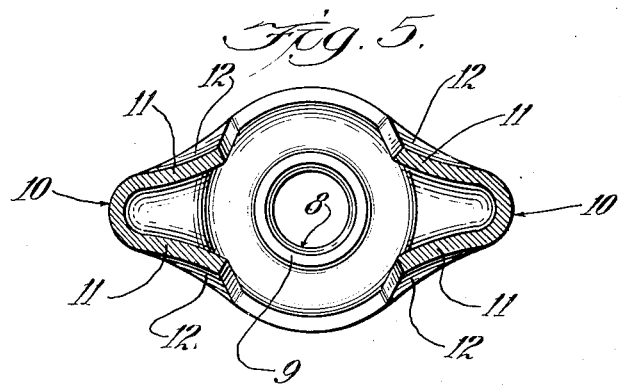

1,773,146

UNITED STATES PATENT OFFICE

HARRY F. KELLOGG, OF CHICAGO, ILLINOIS, ASSIGNOR TO CENTRAL SCREW COMPANY, OF CHICAGO, ILLINOIS, A CORPORATION OF ILLINOIS

WING NUT

Application filed January 6, 1927. Serial No. 159,379.

This invention relates to the manufacture of wing nuts and one of the objects is to make a wing nut of novel, strong and substantial construction out of sheet metal by stamping and bending a blank to shape and then tapping the neck.

And another object of the invention is to provide a method for making wing nuts by stamping a blank from sheet metal and then bending the blank to obtain the desired form and configuration and finally tapping a hole provided in the center of the base to receive the threaded end of a bolt.

In the accompanying drawings I have illustrated a selected embodiment of the invention and referring thereto:

Fig. 1 is a perspective view of the blank as formed in the stamping operation.

Fig. 2 is a perspective view of the wing nut bent to shape.

Fig. 3 is a sectional view on the line 3—3 of Fig. 4 showing the completed wing nut.

Fig. 4 is a transverse sectional view on the line 4—4 of Fig. 3.

Fig. 5 is a horizontal sectional view on the line 5—5 of Fig. 3.

Referring to the drawings Fig. 1 illustrates the blank which is stamped in one operation out of sheet metal and comprises wing members 6 having rounded outer ends and projecting oppositely from the substantially circular central portion 7, which is provided with an opening 8 surrounded by an upstanding flange forming a collar 9. The blank is then subjected to a bending operation and the wing members are bent to form wings 10, 10 which project upwardly and outwardly from the central portion 7 and have inwardly projecting sides 11, 11, which are slightly dished at 12. Each wing is U-shaped in cross-section throughout its length. At the juncture of the wing with the body portion 7 the cross-section of the wing is in the form of a broad shallow U while at the point of the wing its cross-section is that of a narrow deep U; and between the body and the point the cross-section of the wing tapers from the broad shallow U to the narrow deep U. The wings are symmetrically disposed to provide a wing nut which can be easily and conveniently handled and adjusted, there being no raw edges or sharp corners which might injure the fingers or damage things with which they make contact. The sides of each wing are not pressed tightly together, but they are bent inwardly to form a tapering channel which separates the sides. These wings are, by reason of the particular construction noted, strong and substantial and they have a wide connection with the body portion so that they cannot be easily deformed or broken. The dishing of the sides of the wings not only gives to the wings a shape which makes them more easily handled in adjusting operations, but it also adds to the strength of the sides and of the complete wing.

In the bending operation the central portion 7 of the blank is bent to form a cup shaped body 13 which is also strong and substantial and constitutes an efficient protection for the collar 9. After the bending operation the collar is tapped to receive a bolt.

My invention provides a wing nut of simple and novel construction which can be manufactured at relatively low cost in a few simple operations; and the wing nut is strong and substantial in construction and can be used in place of cast and other and more complicated wing nuts which have been used heretofore and also in many places where other nuts are now customarily used.

I claim:

1. A one-piece wing nut formed from a single piece of sheet metal and comprising a body portion having a threaded opening to receive a bolt and wings projecting upwardly and outwardly from the body portion, the metal forming each wing being bent to provide inwardly projecting sides forming a channel therebetween, the cross-section of the wing tapering from a broad shallow U form at the juncture with the body portion to a narrow deep U form at the point of the wing.

2. A one-piece wing nut formed from a single piece of sheet metal and comprising a body portion having a threaded opening to receive a bolt and wings projecting upwardly and outwardly from the body portion, the metal forming each wing being bent to provide inwardly projecting sides forming a channel therebetween, the cross-section of the wing tapering from a broad shallow U form at the juncture with the body portion to a narrow deep U form at the point of the wing, each wing side being dished in a direction extending in the length of the wing.

HARRY F. KELLOGG.